United States Patent Office 2,956,896
Patented Oct. 18, 1960

2,956,896

CELLULOSE ORGANIC ACID ESTER PLASTICS CONTAINING CERTAIN AROMATIC SULFONES

Charles J. Kibler and John W. Tamblyn, Kingsport, Tenn., assignors to Eastman Kodak Company, Rochester, N.Y., a corporation of New Jersey No Drawing. Filed Aug. 14, 1959, Ser. No. 833,686

4 Claims. (Cl. 106—181)

This invention relates to cellulose organic acid ester plastics, and more particularly to the stabilization of such plastics.

As is well known in the art, plastics having excellent properties for a great many purposes can be prepared from cellulose organic acid esters, such, for example, as cellulose acetate, cellulose propionate, cellulose butyrate, cellulose acetate-propionate and cellulose acetate-butyrate, with suitable plasticizers. Many examples of suitable plasticizers are shown in the art. The choice of plasticizers forms no part of our invention.

However, cellulose organic acid ester plastics have not been entirely suitable for use in places where they are exposed to a considerable amount of ultraviolet light; e.g., out of doors. After one or two months of outdoor exposure in a sunny climate, the plastic bleached and became increasingly brittle until, at the end of from three to six months, depending on the severity of the climate, crazing occurred. The rapid deterioration of appearance was accompanied by an equally rapid breakdown in physical properties, such as strength.

Some compounds whose addition to the plastic composition inhibited physical breakdown of the plastic, caused intense discoloration when the plastic was exposed for any length of time to sunlight or other source of ultraviolet light.

We have found that the addition of a small proportion of a diphenyl sulfone derivative selected from the group consisting of diphenyl 5,5'-sulfonylbis (salicylate)

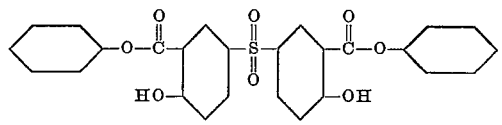

and bis(m-methoxyphenyl) 4,4'-sulfonyldibenzoate

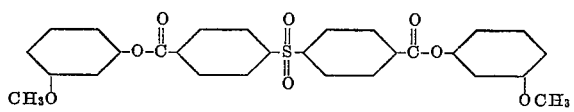

to a cellulose organic acid ester plastic composition strongly inhibits breakdown of the resulting plastic by exposure to ultraviolet light. We prefer to use approximately 0.1% to 10% of the stabilizer, based on the weight of cellulose organic acid ester. Higher amounts give only slightly greater weathering resistance, and may change the physical properties of the plastic. As cellulose organic acid esters, we have employed those mentioned above, in which the acyl groups contain from 2 to 4 carbon atoms. Cellulose acetate plastics are not as effective for outdoor uses as are the mixed and higher esters, that is, those containing an acyl group higher than acetyl, because the usual cellulose acetate plasticizer retention is rather poor under outdoor exposure.

It is very surprising that these particular diphenyl sulfone derivatives exert a stabilizing influence, inasmuch as most aromatic sulfones actually sensitize cellulose organic acid esters toward ultraviolet light.

The compounds which constitute the stabilizers of this invention may be prepared as follows.

*Preparation of diphenyl 5,5'-sulfonylbis (salicylate).*— A suspension of 2.0 g. of diphenyl 5,5-thiobis-(salicylate) in 50 ml. of concentrated acetic acid at 60° C. was treated dropwise with 5 ml. of 30% hydrogen peroxide. After 10 minutes at 60° C. solution was effected, and in about 20 minutes the product began crystallizing. The material was held at 60° C. for 1 hour and was then cooled, and filtered after 3 hours. The yield of product melting at 218–220° was 1.4 g. After recrystallization from acetic acid, it melted at 222–223° C. *Analysis.*—Calcd. for $C_{26}H_{18}O_8S$: C, 63.66; H, 3.69. Found: C, 63.43; H, 3.93.

*Preparation of bis(m-methoxyphenyl) 4,4'-sulfonyldibenzoate.*—A mixture of 6.8 g. of p,p'-sulfonyldibenzoyl dichloride, 70 ml. of dry pyridine, and 5.5 g. of the monomethyl ether of resorcinol was heated at 50–60° C. for 1 hour. The resulting brown solution was poured into 200 ml. of cold water containing an excess of hydrochloric acid. The amorphous mass was crystallized from chloroform and from xylene. The yield of crude product was 6.0 g. The melting point of the recrystallized ester was 150–151° C.

*Analysis.*—Calcd. for $C_{28}H_{22}O_8S$: C, 64.85; H, 4.28. Found: C, 65.09; H, 4.50.

In testing our novel stabilizers, and comparing their effects with those of other compounds, one part by weight of the additive to be tested was incorporated, by hot roll compounding, in 100 parts by weight of cellulose acetate butyrate (13% acetyl, 38% butyryl) along with 12 parts by weight of the plasticizer dibutyl sebacate. The temperature of the front roll was 270° F., and that of the rear roll was 230° F. The roll-compounding was carrier on for 4 minutes. The rolled composition was compression-molded at 320° F. for 10 minutes, into sheets of 0.050 inch thickness. From these sheets test samples 2.5 x 0.5 in. were cut.

The test samples were exposed to artificial weathering in a modified Atlas Twin-Arc weatherometer (Anal. Chem. 25, 460 (1953)). After being conditioned for three days or longer, at 73° F. and 50% relative humidity, the exposed specimens were measured for flexural strength and brittleness by means of the Tour-Marshall test for stiffness in flexure (ASTM D747–43). The exposed side of the sample was arranged on the outer side of the bend. Brittleness was defined to have developed in the exposed specimens when they broke at a bend angle of less than 90°. Data obtained in the weatherometer tests on a number of aromatic sulfone compounds re shown in the following table. Phenyl salicylate is included for comparison.

| Stabilizer | Weather-Ometer Exposure (Hr.) Required For— | |
|---|---|---|
| | 25% Loss of Flexural Strength | Development of Brittleness |
| None | 200 | 200 |
| Phenyl salicylate | 1,000 | 1,000 |
| Diphenyl sulfone | 160 | 160 |
| 2,4'-Dihydroxy diphenylsulfone | 80 | 80 |
| 3,4'-Dihydroxy diphenylsulfone | 120 | 120 |
| 3,5-Dihydroxy diphenylsulfone | 200 | 200 |
| 3,4-Dimethoxy diphenylsulfone | 140 | 140 |
| 4,4'-Dichloro diphenylsulfone | 180 | 160 |
| 4,4'-Dibromomethyl diphenylsulfone | 180 | 160 |
| 4,4'-Diethyl diphenylsulfone | 140 | 100 |
| 4,4'-Diisopropyl diphenylsulfone | 140 | 120 |
| 3,5-Diacetoxy diphenylsulfone | 240 | 180 |
| 3,5-Dihydroxy-4'-methyldiphenyl-sulfone | 180 | 180 |
| 3,4,5-Trihydroxy-4'-methyl diphenylsulfone | 80 | 80 |
| 2,2'-Dihydroxy-5,5'-dimethyl diphenylsulfone | 100 | 80 |
| 3,3'-Dicarbomethoxy-4,4'-dihydroxy diphenylsulfone | 460 | 200 |
| 4,4'-Dicarbomethoxymethoxy diphenylsulfone | 220 | 280 |
| 4,4'-Dimethyl diphenyldisulfone | 80 | 60 |
| Disalicylyl 4,4'-sulfonyldiphenol | 960 | 1,000 |
| Diphenyl 4,4'-sulfonyldibenzoate | 820 | 920 |
| Diphenyl 5,5'-sulfonylbis (salicylate) | >2,000 | >2,500 |
| Bis(m-methoxyphenyl) 4,4'-sulfonyldibenzoate | >2,000 | >2,500 |

The compartively large molecular size of our novel stabilizers makes them of special interest for use in films or fibers, where losses of stabilizer by leaching or evaporation can be serious.

We claim:

1. A cellulose organic acid ester plastic composition stabilized against deterioration by weathering by a content of from 0.1 part to 10 parts by weight, per 100 parts by weight of cellulose ester, of a diphenyl sulfone derivative selected from the group consisting of diphenyl 5,5'-sulfonylbis (salicylate) and bis(m-methoxyphenyl) 4,4'-sulfonyldibenzoate.

2. A cellulose acetate butyrate plastic composition stabilized against deterioration by weathering by a content of from 0.1 part to 10 parts by weight, per 100 parts by weight of cellulose acetate-butyrate, of a diphenyl sulfone derivative selected from the group consisting of diphenyl 5,5'-sulfonylbis (salicylate) and bis(m-methoxyphenyl) 4,4'-sulfonyldibenzoate.

3. A cellulose acetate butyrate plastic composition stabilized against deterioration by weathering by a content of from 0.1 part to 10 parts by weight of diphenyl 5,5'-sulfonylbis (salicylate) per 100 parts by weight of cellulose acetate-butyrate.

4. A cellulose acetate butyrate plastic composition stabilized against deterioration by weathering by a content of from 0.1 part to 10 parts by weight of bis(m-methoxyphenyl) 4,4'-sulfonyldibenzoate per 100 parts by weight of cellulose acetate-butyrate.

References Cited in the file of this patent

UNITED STATES PATENTS

| | | |
|---|---|---|
| 2,069,774 | Reid | Feb. 9, 1937 |
| 2,356,849 | Horback | Aug. 29, 1944 |
| 2,455,581 | Hitchens | Dec. 7, 1948 |
| 2,773,778 | Hoch et al. | Dec. 11, 1956 |
| 2,900,361 | Havens | Aug. 18, 1959 |

FOREIGN PATENTS

| | | |
|---|---|---|
| 1,043,577 | Germany | Nov. 13, 1958 |